E. GUDEMAN.
METHOD OF PREPARING MINIM ALCOHOLIC BEVERAGES.
APPLICATION FILED JUNE 22, 1908.
1,256,894.  Patented Feb. 19, 1918.
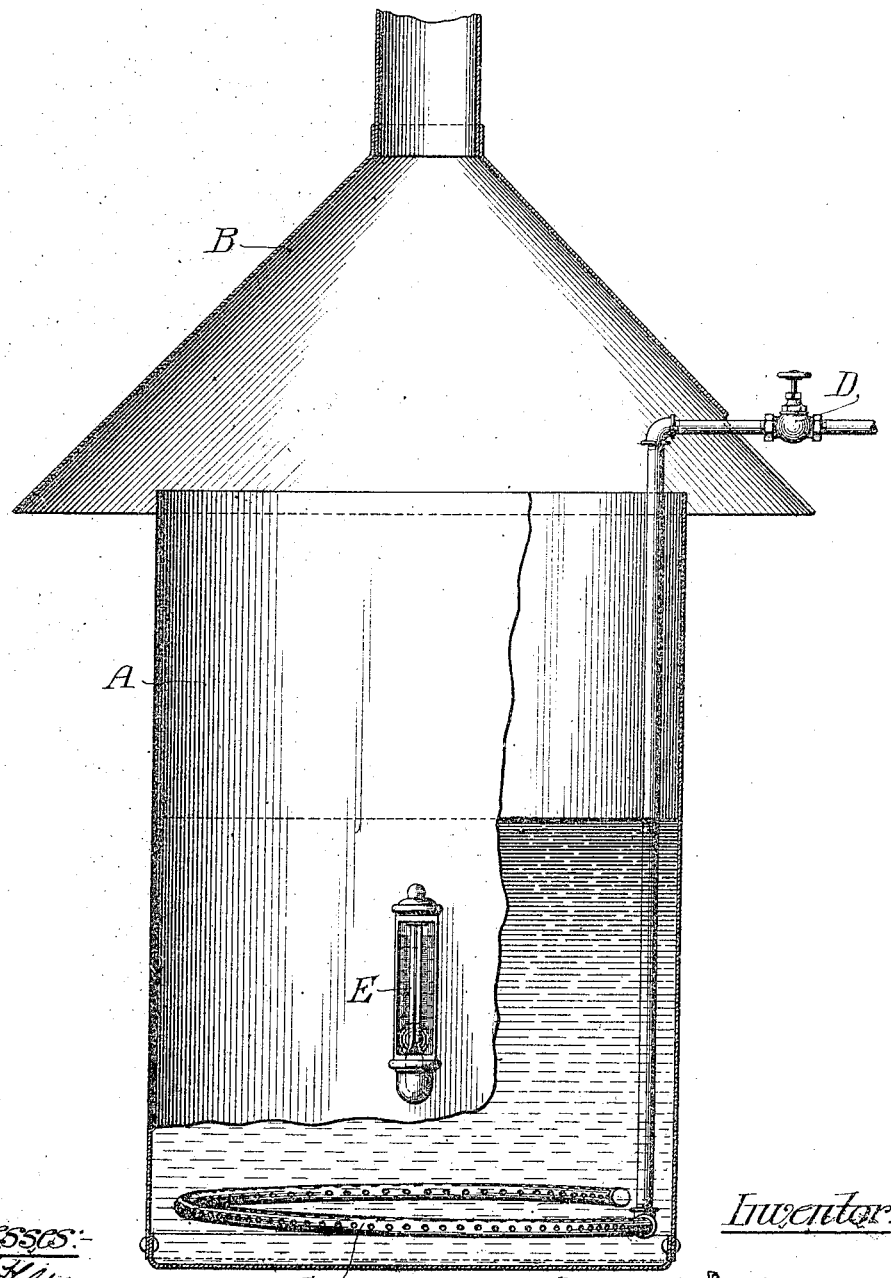

UNITED STATES PATENT OFFICE.

EDWARD GUDEMAN, OF CHICAGO, ILLINOIS.

METHOD OF PREPARING MINIM-ALCOHOLIC BEVERAGES.

1,256,894.

Specification of Letters Patent.     Patented Feb. 19, 1918.

Application filed June 22, 1908. Serial No. 439,748.

*To all whom it may concern:*

Be it known that I, EDWARD GUDEMAN, a citizen of the United States, and a resident of Chicago, in the county of Cook and State of Illinois, have invented certain new and useful Improvements in Methods of Preparing Minim-Alcoholic Beverages, of which I do declare the following to be a full, clear, and exact description.

At the base of the brewing, distilling and vinegar industries, is the group of liquids commonly known as beers, these being usually derived by malting and fermenting some one or more of the cereal grains or other starchy materials or else, by fermentation of glucose, etc. All beers contain alcohol (*i. e.*, ethyl or grain alcohol or ethylhydrate) as a characteristic ingredient, occurring in average quantity to the extent of two per cent. (2%) or oftentimes more.

It has been heretofore proposed to diminish the content of alcohol present in potable beers, but, if attempt be made to do this in the old way,—by evaporation at boiling heat, either in open vessel or in closed vessel under vacuum or superpressure—the result has been to lessen not only the volume of liquid, say, one-half or even more, but also, to markedly modify the flavor and other characteristics of the primary product, thus rendering the resultant article much less acceptable to the user.

The object of my invention is to reduce the amount of alcohol present in the liquid down to a minim, say, to one-half of one per cent. (0.5%) or even less, but otherwise without disagreeably impairing the distinctive qualities of the beer or materially changing the volume of the product. The modified beverage thus obtained is essentially of the minim-alcoholic sort, although quite acceptable to the user by reason of the flavor and other qualities of the primary material that are still retained almost without change.

The quantity of steam that will necessarily be injected into the charge of beer, so as quickly to heat the charge to a temperature of 175° F., to 195° F., will be so copious as to mechanically agitate the charge, and as the supply of steam is thus admitted, it will be found that the major portion of the steam will pass off from the surface of the charge, carrying with it the alcohol, while only a minor portion of the steam condenses to maintain the volume of the charge practically constant.

According to preferred practice, the clarified or unclarified beer is subjected, within an open vessel, to the action of free steam disseminated minutely through the charge in regulated supply sufficient to quickly heat the charge and to maintain it without boiling, say at a working temperature of 175°-195° F.

An ordinary tank or vat A, shown by the accompanying drawing, is open to the air but overhung by a common hood B to trap the escaping vapors, the vat being furnished with a simple coil of perforated pipe C submerged in the charge, and will suffice in practice, care being taken to provide a suitable valve D to control the flow of steam or to check it through the pipe as the operator may decide on simple view of the familiar thermometer E plunged in the bath.

At the outset, a considerable portion of the steam will condense as water, temporarily increasing the volume of the batch. But this increment gradually lessens and, indeed, at the upper range of temperature, distinctive of the method, tends constantly to pass off along with the major portion of the incoming steam, the watery vapors rising freely through the liquid in hot, volatile state to entrain the molecules of alcohol in transit. That is, the vapors of alcohol and of water, mixed, constantly pass off at the surface, to be condensed and separated, at some convenient point beyond, if desired, while the body of liquid need experience ordinarily but slight variation in volume and, besides, suffers no disagreeable change in flavor such as might often render the minim-alcoholic liquor less acceptable for a beverage.

By use of superheated steam, that is, steam heated above ordinary free steam, there is a larger supply of heat units, or, in other words, there is less chance for water condensation to accumulate in the body of the liquid; whereas, with ordinary free steam the bulk will increase somewhat from such cause, despite the minor losses due to the escape of the volatile alcohol and watery vapors. In short, the operator holds, within easy control, the residual volume left at close of the vaporizing treatment, by simple variation in the quantity and temperature of the steam he admits in practice. By the older methods, there was constant need for fresh additions of water to aid in driving off the alcohol and even then, the residual bulk might easily shrink to one-half of the original charge, or even less.

Besides steam, the operator can inject through separate jets, a blast of air, carbonic or other inert gas to promote more rapid separation of the alcohol while, at the same time, he uses a smaller quantity of steam. In such wise, the alcohol passing off, condenses into narrower compass with less amount of water present to dilute it. Being more highly concentrated than were steam used alone, it becomes feasible to employ the volatile liquid, after condensation, for the direct manufacture of higher proof alcohol or spirits or in the direct manufacture of grain or distilled vinegar, as may be preferred.

Obviously, the details of practice can be varied according to the mechanic's skill without departure from the essentials of the invention.

Having thus described my invention, what I claim as new, and desire to secure by Letters Patent, is:—

The method of preparing minim alcoholic beverages, which consists in subjecting the beer charge in an open vessel, at atmospheric pressure, to the action of free steam in copious and regulated quantity proper to mechanically agitate the charge and bring the same to a temperature somewhat below the boiling point, the supply of steam admitted to the charge being such that the major portion of the steam shall be forced through the charge to drive off the alcohol, while a minor portion of the steam condenses to maintain the volume of the charge practically constant, substantially as described.

EDWARD GUDEMAN.

Witnesses:
 JAMES H. PEIRCE,
 KATHARINE GERLACH.